United States Patent [19]
Tobey et al.

[11] 3,850,088
[45] Nov. 26, 1974

[54] SLICING AND FILLING APPARATUS
[75] Inventors: Hubert E. Tobey, Milton; John W. Hood, East Brunswick; Richard L. Twiford, Kendall Park, all of N.J.
[73] Assignee: International Telephone and Telegraph Corporation, Nutley, N.J.
[22] Filed: May 16, 1972
[21] Appl. No.: 253,716

[52] U.S. Cl................ 99/450.2, 83/409.1, 83/422, 99/450.4, 99/450.7, 198/DIG. 1
[51] Int. Cl............................................. A21c 9/04
[58] Field of Search............ 99/450.2, 450.3, 450.4, 99/450.5, 450.7, 494, 516; 83/422, 409.1; 198/84, DIG. 1

[56] References Cited
UNITED STATES PATENTS
3,277,846   10/1966   Kesselman.................... 99/450.4
3,343,504   9/1967    Beik............................... 99/450.4

Primary Examiner—Harvey C. Hornsby
Assistant Examiner—Alan Cantor
Attorney, Agent, or Firm—John T. O'Halloran; Menotti J. Lombardi, Jr.

[57] ABSTRACT

The slicing and filling apparatus is designed to slice and form sandwich type filled cake or bread products in a continuous manner. The apparatus comprises a pair of complementary vacuum chamber assemblies which exert a suction force on the products fed into a predetermined spacing between the two assemblies. The assemblies have a contoured central portion across their width in which is positioned a nozzle for depositing the filling onto one half of the sliced product. A cutting knife is formed in a continuous loop at the input and positioned between the chambers to slice the products into two halves. Each half of the product is then carried by the suction force acting through a belt mounted to the chamber assemblies in a continuous loop, and one of the sliced halves has a filling deposited thereon and by the joining of the assemblies a filled sandwich type product formed.

19 Claims, 6 Drawing Figures

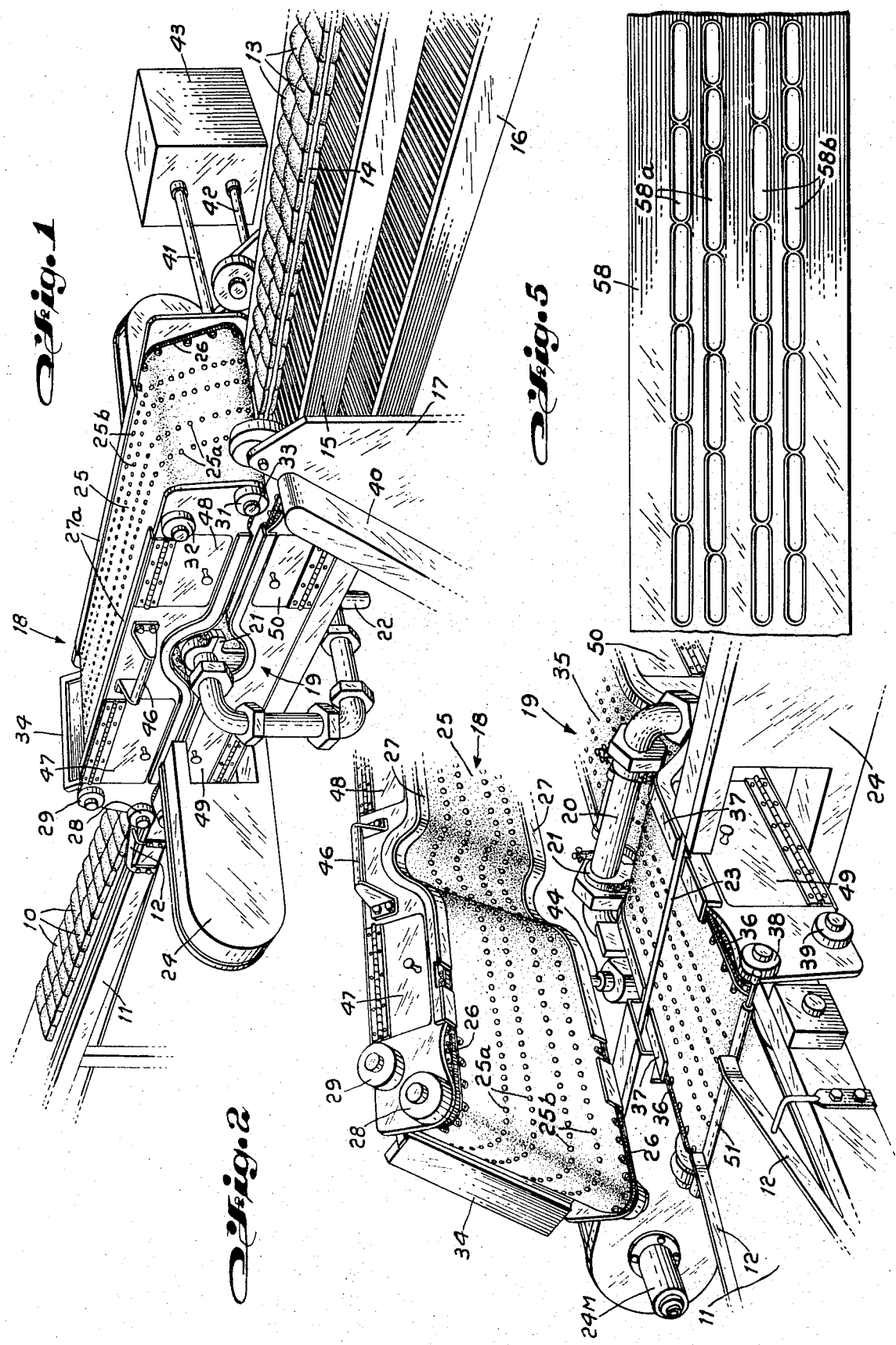

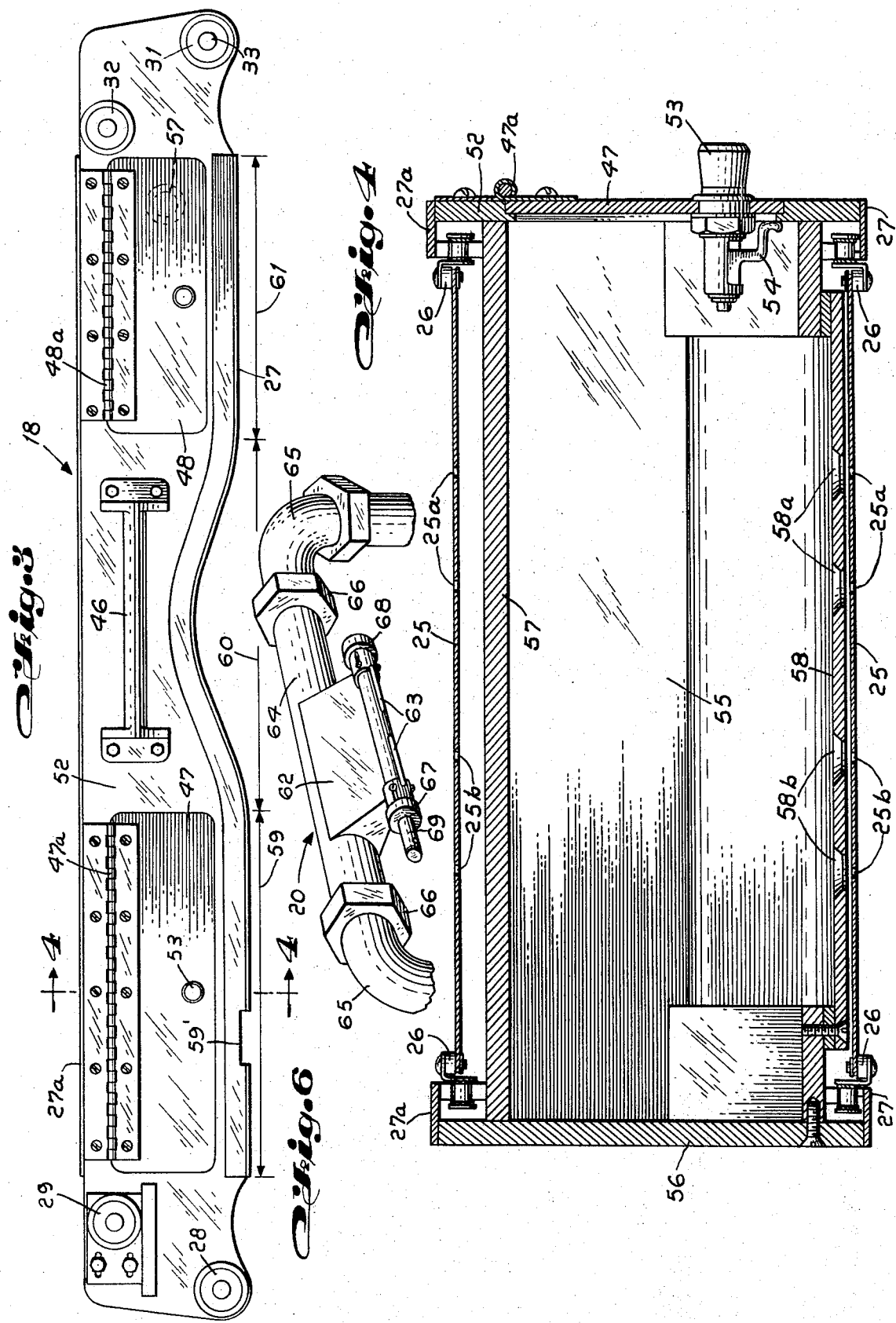

3,850,088

SLICING AND FILLING APPARATUS

BACKGROUND OF THE INVENTION

In general, this invention relates to apparatus for slicing and forming a filled cake or bread type product, and more particularly to a cream filled soft cake type product.

According to the prior art, it was common when producing a filled cake product to provide individual slabs of cake that were individually baked, and a cream was deposited on one slab before another slab of cake was positioned over the cream to form the filled cake type sandwich. This, however, had distinct disadvantages in the baking process, since the individual baked slabs were thinner and when passing through the ovens caused the resultant cake to be dryer and less moist than is possible with items produced according to the invention. In addition, the equipment of the prior art was not adapted to produce in a streamlined and in-line production assembly the slicing, filling and forming of the sandwich in a high speed continuous manner. The cost of the product to the consumer and its appeal both as to its moisture content and filling uniformity are of paramount importance in cake and related products, and therefore must be produced in an effective automatic manner. The apparatus according to the invention provides these numerous advantages with an ease of manufacture of the product and the resulting economies made possible by this equipment.

SUMMARY OF THE INVENTION

It is therefore an object of the invention to provide an improved apparatus for producing sandwich type cake products.

Another object of the invention is to produce an apparatus which is adapted to slice a cake or bread type product into two portions, place a filling on one portion, and join the two halves together in a continuous manner.

Another object of the invention is to provide slicing and filling apparatus adapted to handle soft cake products in a continuous manner.

According to the broader aspects of the invention there is provided a slicing and filling apparatus adapted to slice and form sandwich type filled cake or bread type products. The apparatus comprises a pair of complementary vacuum chamber assemblies which create a suction force in a predetermined spacing between the two assemblies; the assemblies have a contoured central portion across in which is positioned a nozzle for depositing a filling onto one half of a sliced product; a cutting knife is positioned between the chambers at the input to slice the products conveyed therein; and each half of the production is carried by the suction force acting through a belt mounted to the chamber assemblies in a continuous loop.

A feature of the invention is that it is adapted to simultaneously handle two rows of rectangular soft cake products which are fed into the apparatus. Each soft cake product is sliced by a knife edge passing through the apparatus and formed in a continuous loop, and each half of a sliced product adheres to complementary moving belt surfaces of a vacuum chamber assembly. The vacuum chamber assemblies have a central contoured portion which passes over and under a cream depositing nozzle mounted to deposit a stream of cream onto the cake products passing below the nozzle. The two cake halves are joined together forming the sandwich by virtue of the coming together of the straight portions of the vacuum chamber.

BRIEF DESCRIPTION OF THE DRAWINGS

The foregoing and other objects and features of the invention will best be understood if reference is made to the following description in connection with the drawings, in which:

FIG. 1 is a perspective view illustrating the apparatus according to the invention;

FIG. 2 is a partial perspective view of the apparatus in FIG. 1 in an open position for illustrating certain features therein;

FIG. 3 is a side view of a vacuum chamber assembly;

FIG. 4 is a cross sectional view of the vacuum chamber illustrated in FIG. 3;

FIG. 5 illustrates the vacuum chamber cover arrangement of FIGS. 3 and 4; and

FIG. 6 illustrates a cream depositing nozzle according to the invention.

DESCRIPTION OF THE PREFERRED EMBODIMENT

While reading the following descriptions, those skilled in the art should recognize that the apparatus described may be used in conjunction with all shapes and sizes of cake products. Also this apparatus may be used in automatic sandwich making in which a spreadable filling is pumped onto one half of a bread type product and the sandwich formed. In addition, modifications may include the addition of another nozzle at the end of the apparatus for providing an icing, thereby making this apparatus suitable for making layer cakes of any shape.

Referring now to FIGS. 1 and 2, the major features and elements of the apparatus according to the invention will now be described.

The individual cake products 10 are fed in two rows into the apparatus by an input conveyor 11 having input guides 12 for properly directing the cake products 10 into the apparatus. An individual cake product 10, prior to slicing and filling has an approximate overall rectangular dimension 2½ × 3 ¾ × 1 inches. The pieces are fed to the apparatus at a rate of approximately 600 pieces per minute, which rate may be increased depending on the nature of the product to be handled, and the capacity of the other conveying and wrapping equipment in the system. When the products 13 exit from the apparatus the cake items are filled, the products 13 now have a dimension of 2½ × 3 ¾ × 1½ inches indicating that a cream filling 14 of approximately one-half inch has been placed between the two halves of the cake. The product was sliced by the apparatus into approximately two one-half-inch portions prior to depositing of the cream and joining the halves into the sandwich type product 13. The output conveyor 15 is formed in a loop with a return leg portion 16 mounted adjacent the exit of the apparatus and supported by support means 17.

The apparatus comprises two main portions, an upper vacuum chamber assembly 18 and a lower vacuum chamber assembly 19. The upper and lower assemblies have a contoured oval-shaped central portion through which is passed a cream depositing nozzle assembly 20 which is mounted to the lower chamber assembly by means 21. The tube 22 connects the cream nozzle assembly 20 to a cream filling source not shown. Through the predetermined spacing between the assemblies 18, 19 adjacent the input end of the apparatus, a knife band 23 is positioned and moving in a continuous loop within the mounting means 24 and driven by motor 24M. The knife edge 23 is positioned between the upper and lower vacuum assemblies a predetermined amount sufficient to slice the product passing through the apparatus approximately in half. The knife band is mounted similar to a band saw in a continuous loop about assembly 19 and driven by motor 24M.

The upper chamber 18 has mounted thereon and moving in a continuous loop about the chamber a conveying belt 25 which is mounted by chain links 26 which are carried in the channels 27 in the assembly 18 so that it follows the contoured shape of the chamber assembly 18. The belt is mounted to travel about rollers 28, 29 and 31, 32. A scraper 34 is positioned on assembly 18 to clean the surface of belt 25, should any excess cake particles adhere to the suction holes in the belt. A similar scraper is likewise positioned on the lower chamber assembly.

As illustrated, the belt 25 generally is configured to have two pair of suction holes 25a, 25b. The suction force acts through these holes which are positioned in the belt to attract and convey the cake. After cakes 10 are sliced by band 23, the two portions of the cake are conveyed by the conveying belts due to the suction force, and passed over and under the creaming nozzle assembly 20 according to the contours of the upper and lower assemblies 18, 19. In a similar manner lower chamber assembly 19 has a belt 35 chain mounted and moved by the chain links 36 riding in grooves 37 of the lower assembly 19. The conveying belt 35 moves in a continuous loop about rollers 38, 39, the other two front rollers are not shown, and chain driven from the drive pulley arrangement 40. The belt 35 has two pair of holes 35a, 35b adapted for holding the cake product prior to slicing and for passing the sliced lower half under the nozzle assembly 20 according to the contour of the lower chamber 19.

The upper and lower assemblies 18, 19 are coupled by tubes 41, 42 respectively, to a vacuum pump assembly 43 which creates the vacuum within chambers 18, 19. Chambers 18, 19 are hingedly mounted together by a pair of hinge means 44, only one is shown, and the top assembly may be lifted by handle 46 for cleaning and for removal or adjustment of the nozzle or the band knife. The upper chamber assembly 18 includes two doors 47, 48 hingedly attached. These doors are used for cleaning the internal portions of the chamber from any debris to enable a proper vacuum to be created therein. In a similar manner doors 49, 50 are hingedly attached to the lower chamber assembly 19.

The operation of the equipment is as follows. The two rows of cake products 10 are guided into the apparatus and pass over smooth transfer roller 51. The vacuum created within the chamber assemblies creates a suction force on each row of products which are rigidly held by the complementary holes 25b, 35b and 25a, 35a to enable the slicing of the product by the knife band 23. After cutting of the product in half, the upper halves are carried by the conveying belt 25, over nozzle assembly 20, and the lower half of the sliced product is carried by belt 35 under nozzle assembly 20 by virtue of the suction force created through the holes of the belts 25, 35. The cream filling is ejected from the cream ports in nozzle assembly 20 onto the lower halves of the cake products. The two halves are then joined to form the sandwich by means of the coming together of the belts on the two chamber assemblies. The resultant porduct exits from the apparatus as illustrated in FIG. 1.

Referring now to FIG. 3, a side view of the upper vacuum chamber assembly 18 is illustrated. FIG. 4 illustrates a cross section of the assembly taken along lines 4—4, together with the belt 25 mounted therein. Only one assembly is illustrated since the assembly 19 has a complementary construction as illustrated in FIGS. 1 and 2. The upper chamber assembly 18 has its doors 47, 48 hingedly attached by means 47a, 48a to the side wall 52. The door 47 contains a knob 53 which has associated therewith locking means 54 to retain the door in a closed condition when the chamber 55 does not require cleaning. The side wall 56 has connecting port 57, illustrated in phantom lines in FIG. 3, for connecting to tube 41 of the vacuum assembly 43. A top cover 57 and a bottom cover 58 complete the chamber enclosure. The top cover 57 is a straight plate, but the lower cover 58 is further detailed in FIG. 5. This cover has hole arrangements 58a, 58b to match the corresponding holes in belt 25. This enables the vacuum drawn in chamber assembly 18 to create the suction force through the complementary holes in the belt 25.

In addition, the lower vacuum cover 58 is divided into three main sections 59, 60, 61. The first section 59 is a straight portion in which the individual cake items are sliced, the second section 60 is the contour portion which passes over the creaming nozzle assembly, and the third section 61 is another straight section wherein the joining of the two halves occurs. Positioned within the first section is a knife groove 62 to accommodate the knife band. The conveying belt 25 passes about rollers 28, 29 and 31, 32, one of which rollers is driven to cause the belt to move in a continuous loop. The chain links 26 are mounted to ride within the lower guide means 27 and upper guide means 27a.

Referring now to FIG. 6, a creaming nozzle assembly 20 which is positioned within the apparatus is illustrated. A nozzle 62, having a pair of cream ports 63, is mounted to a central tube section 64. Connecting tubes 65 are coupled by collars 66. Flow control means 67, 68 are positioned on the nozzle extension rod 69 and are slidably adjustable to adjust the cream port openings and control the amount of the cream flowing from these ports onto the lower half of the cake product passing under the creaming nozzle assembly.

The slicing and filling apparatus described is adapted to slice and form sandwich type filled soft cake products. The apparatus incorporates a conveying belt mounted on each of a pair of complementary vacuum chamber assemblies which create a suction force through holes in the belt. The assemblies have a contoured central portion in which is positioned a nozzle for depositing a cream filling onto one half of the cake, and a cutting knife is positioned between the chambers at the input portion of the apparatus to slice the cake into approximately two halves. Each half is carried by the belt until the cream is deposited and the halves joined to form a filled sandwich type cake.

While we have described above the principles of our invention in connection with specific apparatus, it is to

We claim:

1. Slicing and filling apparatus comprising:
a pair of symmetrically shaped vacuum chamber assemblies mounted opposite each other and exerting a suction force on a predetermined spacing between the two assemblies;
means mounted on said assemblies for conveying a product to be sliced and filled through said apparatus;
a knife edge mounted to pass through said spacing to slice said product into two portions;
depositing means positioned between said assemblies; and
said conveying means conveys one portion over and one portion under said depositing means to enable depositing of a filling on one portion of said product, and said conveying means to rejoin said two portions together.

2. Apparatus for handling soft cake products comprising:
a first and second vacuum chamber means, each having a conveying belt continuously moving in a loop about said chamber means and having holes through which a suction force is created;
said first and second chamber means having a contoured central portion and being mounted in juxtaposition with a predetermined spacing therebetween;
a knife edge positioned at an input section of said chamber means for cutting the products conveyed through the apparatus into two portions; and
depositing means positioned in the contoured central portion for depositing a filling on one poriton, whereby said first and second means cooperate to rejoin said two portions together with said filling inbetween said two portions.

3. The apparatus of claim 2 wherein said first and second chamber means have a contoured bottom and top plate respectively, each with a predetermined hole arrangement to match the hole configuration in said belts.

4. The apparatus of claim 2 wherein said depositing means includes a directed nozzle.

5. The apparatus of claim 2 wherein said knife edge is formed in a continuous loop about one of said chamber means.

6. The apparatus of claim 2 wherein said first and second chamber means are hingedly attached.

7. The apparatus of claim 2 including conveying means to convey said products into and out of said apparatus.

8. The apparatus of claim 2 wherein each of said chambers include hinge mounted doors for cleaning the interior of said chambers.

9. The apparatus of claim 2 including means for creating a vacuum in said chambers.

10. The apparatus of claim 2 wherein said soft cake products are in a rectangular shape and are fed to the apparatus in two rows.

11. The apparatus of claim 10 wherein two of said cake products are simultaneously and sequentially halved, filled, and formed into a sandwich type configuration.

12. Apparatus for handling cake or bread type products comprising:
a first and second vacuum chamber means, each having a conveying belt continuously moving in a loop about said chamber means and having holes through which a suction force is created;
said first and second chamber means having a contoured central portion and being mounted in juxtaposition with a predetermined spacing therebetween;
a cutting means positioned at one input section of said chamber means and across the width of said chambers for cutting the products conveyed through the apparatus into two portions; and
depositing means positioned in the contoured central portion for depositing a filling on one portion, whereby said first and second means cooperate to rejoin said two portions together in sandwich fashion with said filling between.

13. The apparatus of claim 12 wherein said first and second chamber means have a contoured bottom and top plate respectively, each with a predetermined hole arrangement to match the hole configuration in said belts.

14. The apparatus of claim 13 wherein said depositing means includes a directed nozzle having adjusting means.

15. The apparatus of claim 14 wherein said cutting means is a band knife formed in a continuous loop about one of said chamber means.

16. The apparatus of claim 15 wherein said first and second chamber means include scraper means for cleaning said belts.

17. The apparatus of claim 16 wherein said belts are mounted about four rollers in each of said first and second chamber means.

18. The apparatus of claim 17 wherein said products are fed to the apparatus in two rows.

19. The apparatus of claim 18 wherein two products are simultaneously sliced, a filling deposited on one portion, and joined together in sandwich fashion.

* * * * *